United States Patent [19]

Totman

[11] Patent Number: 4,530,340
[45] Date of Patent: Jul. 23, 1985

[54] ACID CATALYZED COMBUSTION

[76] Inventor: Millard C. Totman, 1524 Rosewood Way, Colusa, Calif. 95932

[21] Appl. No.: 259,491

[22] Filed: May 1, 1981

[51] Int. Cl.³ ............................................. F02B 77/02
[52] U.S. Cl. .................................... 123/669; 123/670
[58] Field of Search ............................ 123/668–670, 123/193 R, 193 CI, 193 CH, 193 CP, 193 P; 427/202, 205, 419.3

[56] References Cited

U.S. PATENT DOCUMENTS

| | | | |
|---|---|---|---|
| 2,656,830 | 10/1953 | Houdry | 123/670 |
| 2,926,649 | 3/1960 | Hicks | 123/668 |
| 2,978,360 | 4/1961 | Bradstreet et al. | 123/670 X |
| 4,284,675 | 8/1981 | Sakai et al. | 427/419.3 |

Primary Examiner—A. Cuchlinski, Jr.
Attorney, Agent, or Firm—Harvey B. Jacobson; Clarence A. O'Brien

[57] ABSTRACT

The combustion zone of an internal combustion engine is provided with a catalyst which is incorporated in the combustion zone as a thin layer placed on the internal cylinder walls and/or the top surface of the piston and/or on surfaces of the spark plug which are exposed to the combustion zone of the cylinder for the purpose of cracking the carbon-carbon bonds in the heavier fuel molecules immediately prior to combustion within the combustion zone of the cylinder. The light fuel molecules produced during fuel contact with the catalyst yields a more complete combustion and extraction of the exothermic energy, thereby increasing fuel economy and decreasing the amounts of incomplete combustion products leaving the exhaust. The catalysts for use in the present invention include acidic metal oxide mixtures.

18 Claims, 1 Drawing Figure

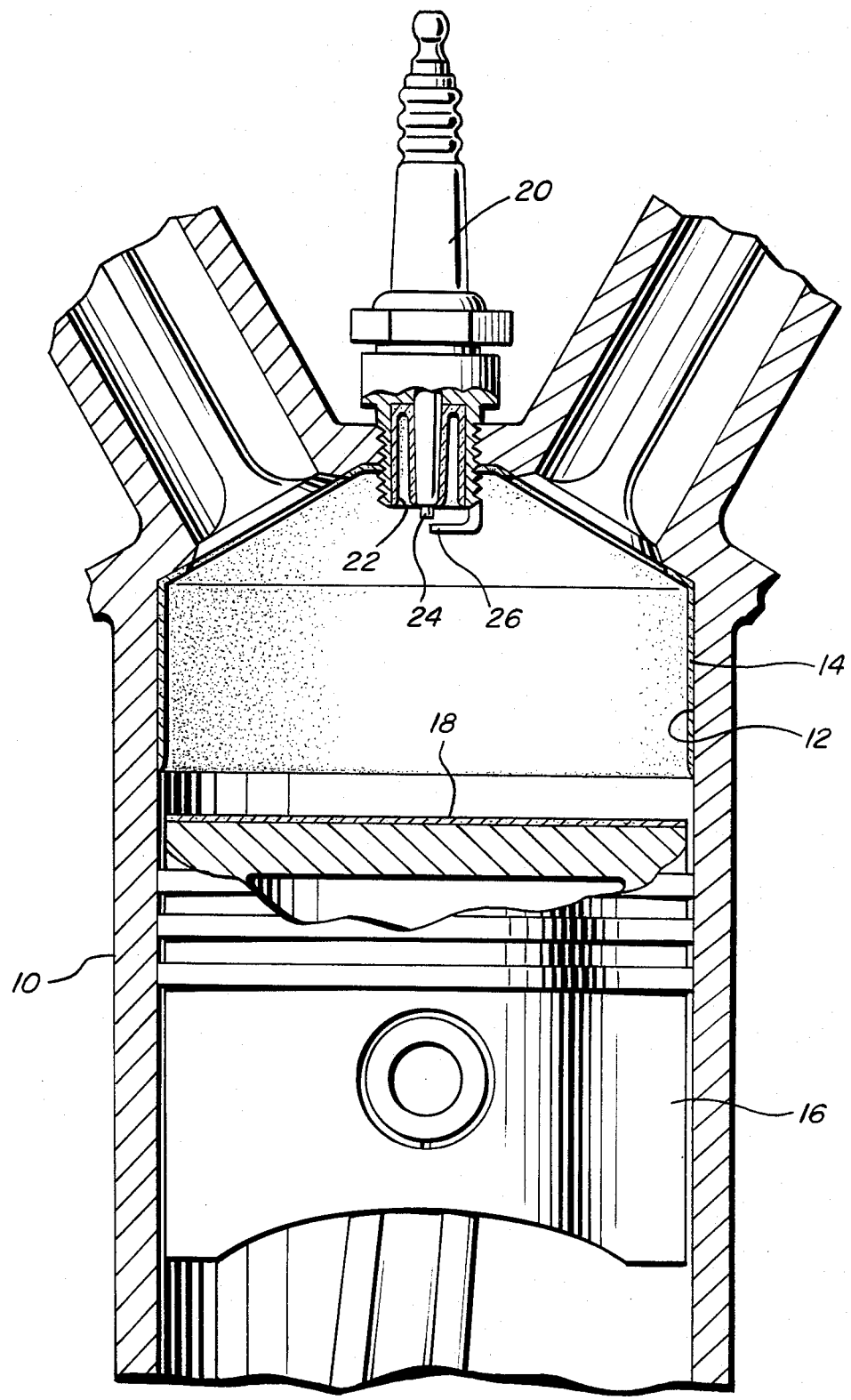

ACID CATALYZED COMBUSTION

BACKGROUND OF THE INVENTION

Field of the Invention

This invention relates to combustion of hydrocarbon fuel within the combustion zone of an internal combustion engine and, in particular, to the placement of a catalyst within the combustion zone for cracking the hydrocarbon fuel molecules and thus producing a more volatile hydrocarbon fuel.

A method of catalytically supporting thermal combustion is disclosed in U.S. Pat. No. 3,870,455, issued Mar. 11, 1975, in which catalytically-active materials including a platinum group metal is deposited on a catalytic slip or composite which contains a mixture of alumina, a rare earth metal oxide, and a metallic oxide wherein the metal is IVB, selected VIB metals, and mixtures thereof. Provision is made for contacting hydrocarbon fuels mixed with a portion of air with the catalyst to form an effluent of high thermal energy. The catalysts are particularly useful in promoting the oxidation of materials frequently present in exhaust gases from the combustion of carbonaceous fuels. While this prior patent is an attempt to catalytically improve thermal combustion by contacting the hydrocarbon fuel with the catalyst, the patent does not specifically disclose an efficient means by which the catalyst can be incorporated within the combustion zone of an internal combustion engine, and particularly an internal combustion engine which is placed on board a motor vehicle. Further, the catalysts disclosed in this patent are for promoting the oxidation of the hydrocarbon fuel molecules and are quite different from the use of the acidic catalysts of the present invention which are used primarily for the purpose of cracking hydrocarbon fuel molecules by breaking the carbon-to-carbon bonds thereof, allowing more efficient oxidation of the lighter fuel molecules which are produced. Furthermore, the present invention provides a means by which the catalysts can be incorporated within the combustion zone of the internal combustion engine without the requirement of changes in the structure of the engine.

SUMMARY OF THE INVENTION

In accordance with the present invention, the combustion zone of an internal combustion engine is treated so as to include therein a catalyst which upon contact with a hydrocarbon fuel will crack or break the carbon-carbon bonds of the heavier hydrocarbon molecules producing a more volatile fuel immediately prior to combustion of the fuel in the combustion chamber. Cracking of the heavier hydrocarbon molecules of the fuel allows greater oxidation of the carbon and hydrogen atoms of the lighter fuel molecules produced resulting in a more complete combustion and extraction of the exothermic energy of the fuel as well as producing an exhaust which will be relatively clean such that the exhaust is substantially free of hydrocarbons.

The catalyst is placed in solid form within the combustion zone of the internal combustion engine such that the hydrocarbon fuel molecules will contact the catalyst immediately prior to combustion. This is achieved by forming a thin layer or coating of the solid catalyst on substrate surfaces of the combustion zone which are not subjected to the mechanical abrasive action of metal on metal contact between moving components of the internal combustion engine. The catalyst can be placed in solid form on the interior surfaces of the head of the cylinder, on surfaces of the spark plugs which are exposed to the interior of the cylinder, with the exception of the spark points, as well as on the top surface of the piston. The solid catalyst is applied on such surfaces in the form of particles which are bound to the desired surfaces by a molten metal or glass bonding agent which hardens to hold the catalyst particles in place.

The solid catalysts useful to crack the larger hydrocarbon fuel molecules comprise an acidic metal oxide mixture in which a portion of the mixture comprises a carrier which has incorporated therein a metal oxide containing a metal atom of less electronegativity than the carrier, thus producing a metal oxide mixture which will accept a hydrogen ion and produce the catalytic activity required to crack the heavier hydrocarbon fuel molecules. Carriers which are useful in the solid acid catalyst include silica, alumina and oxides of group IVB and VIB metals, such as zirconium dioxide and chromium oxide. Metal oxides which can be added to the carrier to produce a metal oxide mixture which will accept hydrogen ions include aluminum oxides, magnesium oxides and group VIB and group VIII metal oxides, such as cobalt and titanium dioxide. The metal oxides are added to the carriers in amounts ranging from about 10 to about 30% by weight with about 25% of the added metal oxide having a relatively large pore volume.

It is, therefore, an object of the present invention to enhance the combustion of hydrocarbon fuels within the combustion zone of an internal combustion engine.

In accordance with the aforementioned object, another object of the invention is to catalytically crack the hydrocarbon fuel molecules immediately prior to combustion within the combustion zone, thus producing a more easily oxidized fuel.

Another object of the present invention is to catalytically crack relatively heavy fuel molecules within the combustion zone of an internal combustion engine immediately prior to combustion by incorporating within the combustion zone a solid catalyst.

Still another object of the present invention is to incorporate a solid acid catalyst within the combustion zone of an internal combustion engine by coating fuel contacting surfaces of the combustion zone for the purpose of cracking relatively heavy fuel molecules.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

The FIGURE is a cross section of a single cylinder in an internal combustion engine illustrating the placement of the solid acid catalyst coating placed on the fuel contacting surfaces of the combustion zone.

DETAILED DESCRIPTION OF THE INVENTION

The present invention comprises the incorporation of a catalytic agent into the combustion zone of an internal combustion engine, in which the catalytic agent is capable of cracking by contact with the hydrocarbon fuel relatively large hydrocarbon fuel molecules into lighter molecules by breakage of C-C bonds immediately prior to combustion. The lighter hydrocarbon fuel molecules produced due to the action of the catalyst can be more easily oxidized during combustion. A more complete combustion yields greater extraction of the fuel energy as well as an exhaust which is greatly reduced in hydrocarbons compared with uncatalyzed combustion. The catalyst, an acidic inorganic metal oxide, is placed as a coating upon the fuel contacting surfaces of the combustion zone of the internal combustion engine. Referring to the FIGURE, cylinder 10 is provided on its interior surface 12 along the head of cylinder 10 with a coating 14 of the solid acid catalyst useful in cracking the relatively heavy hydrocarbon fuel molecules upon contact therewith. Likewise, piston 16 can be provided with a catalyst coating 18 along the top surface thereof. Preferably, the solid catalyst of the present invention is provided as a layer on those surfaces of the combustion zone which are not subjected to any mechanical abrasive action formed by metal-on-metal contact. Other hydrocarbon fuel contacting surfaces within the combustion zone may be treated with the catalytic agent of the present invention including spark plug 20 which is provided with a coating 22 of solid catalyst on those surfaces of spark plug 20 which are exposed to the combustion zone within the interior of cylinder 10. When treating the spark plug with the solid catalyst, spark points 24 and 26 should be maintained free of solid catalyst. The solid catalyst is applied in particulate form onto the desired substrate surfaces within the combustion zone by means of a bonding agent, such as a fusible glass or metal which holds the catalyst particles to the substrate surfaces such that the catalyst particles protrude from the bond coat to leave a major portion of the their surface area exposed to the zone of combustion.

The catalyst for use in the present invention must be capable of breaking the carbon-carbon bonds of the hydrocarbon fuel molecules so as to reduce the size of the relatively large hydrocarbon molecules into fuel molecules which can be completely oxidized during combustion. Useful catalysts include solid inorganic metal oxide mixtures which are weakly acidic. These weakly acidic solid catalysts are comprised of a carrier such as silica, alumina and oxides of group IVB and VIB metals, such as zirconium and chromium, and mixtures thereof. Added to the carrier are oxides of metals, including aluminum, magnesium, group VIB and VIII metals, such as titanium and cobalt. The acid properties of the catalyst are produced by the addition of the lesser electronegative atom of the metal oxide to the carrier allowing the absorption of hydrogen ions which become associated with the negative lattice charge. Examples of specific carrier and metal oxide mixtures which result in acid activated catalysts useful to crack the hydrocarbon fuel molecules include an aluminum oxide carrier having added thereto either cobalt, magnesium or titanium oxide; silicon di-oxide and zirconium dioxide carriers having added thereto aluminum oxides; acid activated alumina-silica containing clays such as bentonite. The additional metal oxides are incorporated in the carrier oxide in amounts ranging from about 10% to about 30% by weight of the catalyst and should be of sufficient pore volume and surface area to effectively catalyze breakage of the carbon-to-carbon bonds of the heavier hydrocarbon fuel molecules.

Examples below are given to illustrate the principles of the invention and should in no way be so construed as to unduly limit the invention. It should, of course, be understood that there are many acidic inorganic metal oxide mixtures which will catalyze the cracking of hydrocarbon molecules. The present invention sets forth a means by which catalytic cracking of hydrocarbon fuel molecules can be produced within the combustion zone of an internal combustion engine and is not to be strictly limited to the specific inorganic metal oxide catalysts disclosed above or set forth in the following examples.

EXAMPLE I

The present example describes the formation of a silica-alumina acid activated catalyst for use in the present invention.

First, a silica hydrogel is formed to which is added aluminum oxide to form an alumina-silica hydrogel. This is accomplished by combining a dilute solution of sodium silicate with an acid such as hydrochloric acid to yield silicic acid (hydrated silica). To the silica hydrogel is added a 25% aluminum sulfate solution thus introducing the aluminum ion to the lattice of the silica. Hydrolysis is performed by the addition of aqueous ammonium hydroxide to form an alumina-silica hydrogel which is then washed free of soluble salts using a filter and approximately eight gallons of high purity water per pound of the hydrogel. The formed filtered cake is then slurried with water and to this is added aluminum oxide and a metal flux such as lead oxide to result in a mixture containing 53% by weight alumina-silica, 2% by weight alumina and 45% lead oxide. The mixture is drained of water and dried at 240° C. and then fused in a kiln at approximately 810° C. The fused mixture is then fractured by ball milling or by cold water quenching to produce particles which pass through a #40 Tyler screen and which are retained on a #60 Tyler screen.

The metal surface which is to receive the catalyst material is cleaned of all dirt and grease and pickled by application of a conventional acid to the surface which removes rust and scale and lightly etches the metal to produce a surface which will allow the catalyst mixture to be adhered. A bonding metal of an aluminum alloy, such 97% to 95% aluminum and 3% to 5% copper, can be used to adhere the catalyst when an aluminum substrate is utilized. When the substrate has a higher melting point, a copper alloy of 67% copper to 33% zinc can be used to adhere the catalyst to the substrate. The bonding agent is also applied in the form of a fine powder and the temperature of the powder raised so that the bonding agent is placed in the molten state. The particles of solid acid catalyst are then pressed and imbedded into the molten bonding material. The resultant thickness of the bonding material should be about 20 to about 30 mils. On cooling, the powdered catalyst will be affixed to the metal surface with most of the surface of the catalyst particles exposed and producing a substrate having the appearance of a coarse sandpaper.

The substrate which receives the bonding metal and catalyst particles may be the walls of the combustion chamber or a thin plate of metal which can be coated and then attached to the metal surfaces of the combustion chamber by metal screws, or other attachment means.

EXAMPLE II

The acid activation of bentonite is another method of obtaining an alumina-silica catalytic mixture. Bentonite when treated with hot sulfuric acid develops the necessary acidic alumina-silica mixture. The bentonite clay is first ground to powder form and then mixed with about 4 ounces of sulfuric acid per pound of clay which reacts with the clay to remove approximately 80% of the aluminum from the clay. The clay is washed with eight gallons of pure water per pound and dried and mixed with about 45% lead oxide flux. The catalytic mixture is then dried and formed into particles in the same manner as Example I.

An increase in the catalytic activity of the acid catalyst formed in Examples I and II may be produced by applying an acid bath, such as 0.02 ounces of nitric acid per pound of catalyst and rinsing thoroughly prior to applying the bonding material.

EXAMPLE III

The third method involves the mixing of aluminum oxide with either cobalt oxide, magnesium nitride, or titanium dioxide. These materials can be added to the alumina in powdered form in an amount of approximately 25% by weight of the mixture. The mixture is then fused at a temperature of 2100° C. and the fused mixture crushed into particles ranging in size from those that pass through a #40 Tyler screen and those retained on a #60 Tyler screen. The particles are then ready to be bonded to the metal surface in the manner described above. Likewise, this catalyst mixture can be applied with a glass bonding agent comprising 20% lead oxide, 12% calcium oxide, 4% potasium sodium oxide, 7% aluminum oxide and 57% silica. This mixture is fused in a kiln at approximately 1100° C. and then crushed and applied in a manner as described above.

By affixing a solid acid catalyst to the internal surface of the combustion chamber of the internal combustion engine, the hydrocarbon fuel can be broken into a more volatile fuel thereby affording a more complete combustion of the fuel. Relatively heavy fuel molecules, such as those contained in gasoline or diesel fuel when contacting the acid catalyst are broken into lighter fuels, such as butane, propane and similar alkanes which can be completely oxidized at the temperature of combustion. More complete combustion produces more energy per gallon of fuel and further produces an exhaust will contain mostly $CO_2$ and water and be relatively free of small oxygen-containing hydrocarbons. Small amounts of water may have to be added to the fuel in order to keep the acid catalyst from becoming deactivated by carbon build up.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a combustion chamber of an internal combustion engine having a combustion zone, catalytic cracking means positioned within the combustion zone for converting heavy hydrocarbon fuel molecules charged into the combustion chamber into a combustible mixture of lighter and more volatile hydrocarbon carbon fuel molecules, said catalytic cracking means comprising an acid catalyst applied as a coating on surfaces of said combustion zone not subject to mechanical abrasions.

2. The combustion chamber of claim 1 wherein said chamber is a cylinder containing a moving piston therein which forms said combustion zone at one end of said cylinder, said coating being applied to the internal surfaces of said one end of said cylinder.

3. The combustion chamber of claim 2 wherein said catalyst coating is further applied to a surface of said piston exposed to said combustion zone.

4. The combustion chamber of claim 2 further including an igniting means, portions of said igniting means being exposed to said combustion zone, said catalyst further being coated on said portions of said igniting means exposed to said combustion zone.

5. The combustion chamber of claim 1 wherein said chamber is a cylinder containing a moving piston which forms said combustion zone at one end of said cylinder, said catalyst coating being applied to a surface of said piston exposed to said combustion zone.

6. The combustion chamber of claim 1 further including means to ignite said combustible mixture within said combustion zone, a portion of said igniting means being exposed to said combustion zone, said catalyst coating being applied to said exposed portion of said igniting means.

7. The combustion chamber of claim 1 wherein said acid catalyst is an acidic metal oxide mixture.

8. The combustion chamber of claim 7 wherein said metal oxide mixture of comprises a carrier selected from the group consisting of silicon dioxide, aluminum oxide and zirconium dioxide and an added metal oxide of lesser electronegative level selected from the group consisting of cobalt oxide, magnesium oxide, titanium oxide and aluminum oxide.

9. The combustion chamber of claim 8 wherein said added metal oxides are provided in amounts of about 10% to about 30% by weight of said carrier.

10. The combustion chamber of claim 1 wherein said catalyst is an acidic mixture of metal oxide particles, said metal oxide particles being bonded to said fuel contacting surfaces by a hardened molten metal film.

11. The combustion chamber of claim 1 wherein said catalyst is an acidic metal oxide catalyst in particulate form, said catalyst being bonded to said fuel contacting surfaces by means of a hardened fused glass.

12. In an enclosed chamber of an internal combustion engine including means to compress a vaporized fuel within said combustion chamber to initiate ignition and oxidation of said fuel, the improvement comprising the step of coating a catalyst on the surfaces forming the combustion zone within said combustion chamber, said catalyst having an acidic composition to perform a hydrocarbon cracking function with respect to molecules of said fuel.

13. The improvement of claim 12 wherein said catalyst is coated on at least one of the interior surfaces of said combustion chamber, of said igniting means exposed to said combustion zone, and of said compressing means exposed to said combustion zone.

14. The improvement as defined in claim 13 wherein the catalyst is coated by applying a bonding agent to the interior surface, said bonding agent having a melting point lower than that of the interior surfaces; heating the interior surfaces to a temperature between said melting points until the bonding agent is in a molten state; and embedding the catalyst in the bonding agent while in the molten state.

15. In combination with a combustion chamber device having a variable volume combustion zone to which a fuel mixture is fed containing heavy hydrocarbon molecules, and substrate surfaces exposed to said fuel mixture, means for enhancing combustion within said combustion zone, comprising non-oxidation catalytic means for cracking the heavy hydrocarbon molecules in response to contact with the fuel mixture, and means attaching said catalytic means to at least one of the substrate surfaces not subject to mechanical abrasion for effecting said contact with the fuel mixture to produce lighter and more volatile hydrocarbon molecules from the heavy hydrocarbon molecules within the combustion zone.

16. The combination of claim 15 wherein said catalytic means is a solid layer of acid catalyst particles including a carrier, a metal oxide, and an additive of lesser electronegative level than the carrier.

17. The combination of claim 16 wherein said attaching means comprises a bonding agent adhering to said one of the substrate surfaces and having a lower melting point temperature than that of the substrate surfaces.

18. The combination of claim 15 wherein said attaching means comprises a bonding agent adhering to said one of the substrate surfaces and having a lower melting point temperature than that of the substrate surfaces.

* * * * *